United States Patent [19]

Biale

[11] Patent Number: 4,716,085

[45] Date of Patent: Dec. 29, 1987

[54] MULTI-LAYERED IONOMER-VINYLIDENE CHLORIDE CONTACT LAMINATED STRUCTURES

[75] Inventor: John Biale, Placentia, Calif.

[73] Assignee: Union Oil Company of California, Los Angeles, Calif.

[21] Appl. No.: 874,782

[22] Filed: Jun. 13, 1986

Related U.S. Application Data

[60] Continuation of Ser. No. 714,561, Mar. 21, 1985, abandoned, which is a division of Ser. No. 540,442, Oct. 11, 1983, Pat. No. 4,544,699.

[51] Int. Cl.⁴ .............................................. B32B 27/08
[52] U.S. Cl. .................................... 428/476.9; 428/35; 428/518
[58] Field of Search .................... 428/476.9, 518, 35

[56] References Cited

U.S. PATENT DOCUMENTS

| | | |
|---|---|---|
| 2,909,449 | 10/1959 | Banigan . |
| 3,030,325 | 4/1962 | Scopp ................................ 260/29.4 |
| 3,041,208 | 6/1962 | Hay et al. . |
| 3,324,064 | 6/1967 | Fickentscher . |
| 3,375,126 | 3/1968 | Nagel ................................ 428/518 |
| 3,696,082 | 10/1972 | Smith . |
| 3,714,106 | 1/1973 | Smith et al. ........................ 526/287 |
| 3,736,303 | 5/1973 | Smith et al. . |
| 3,755,252 | 8/1973 | Buning et al. . |
| 3,796,680 | 3/1974 | Brockway et al. . |
| 3,850,726 | 11/1974 | Smith et al. ........................ 428/518 |
| 3,883,455 | 5/1975 | Peos . |
| 3,908,070 | 9/1975 | Marzolf .............................. 161/165 |
| 3,922,451 | 11/1975 | Anschutz et al. .................... 428/35 |
| 3,946,139 | 3/1976 | Bleyle et al. ........................ 428/518 |
| 3,988,157 | 11/1976 | Van Paesschen et al. . |
| 4,002,802 | 1/1977 | Bayless et al. . |
| 4,008,352 | 2/1977 | Dawes ................................ 428/518 |
| 4,048,428 | 9/1977 | Baird, Jr. et al. .................... 428/518 |
| 4,115,334 | 9/1978 | Gerow ................................ 428/518 |
| 4,144,363 | 3/1979 | Balloni et al. . |
| 4,233,074 | 11/1980 | Dodwell et al. . |
| 4,244,988 | 1/1981 | Dodwell . |
| 4,287,298 | 9/1981 | Dodwell . |
| 4,374,894 | 2/1983 | Antlfinger ........................... 428/288 |
| 4,394,486 | 7/1983 | Chattha et al. ...................... 525/162 |
| 4,442,158 | 4/1984 | Distler ................................ 428/518 |
| 4,490,417 | 12/1984 | Shindow et al. ...................... 524/512 |

*Primary Examiner*—Joseph L. Schofer
*Assistant Examiner*—J. M. Reddick
*Attorney, Agent, or Firm*—Dean Sandford; Gregory F. Wirzbicki; June M. Bostich

[57] ABSTRACT

A laminated structure comprises an ionomer polyethylene carboxylate-containing film secured to a second film through a vinylidene chloride copolymer adhesive wherein the vinylidene chloride copolymer includes on a comonomer weight basis:

(a) from about 45 to about 90 percent vinylidene chloride,
(b) from about 5 to about 25 percent of a polar comonomer having one or more hydroxyl groups, and
(c) from about 0 to about 30 percent of a plasticizing monomer for vinylidene chloride in combination with:

(d) a cross-linking agent dissolved in the continuous aqueous phase of the vinylidene chloride copolymer.

34 Claims, No Drawings

4,716,085

MULTI-LAYERED IONOMER-VINYLIDENE CHLORIDE CONTACT LAMINATED STRUCTURES

This application is a continuation of application Ser. No. 714,561, filed Mar. 21, 1985, now abandoned, which is a division of application Ser. No. 540,442, filed Oct. 11, 1983, now U.S. Pat. No. 4,544,699. are characterized by low grease transmission and high hot tack provided by the ionomer films as well as low moisture vapor transmission and low oxygen transmission provided by the adhesive coating.

2. Description of the Art

It is well known that hydrophobic films may be laminated with solvent based adhesive systems such as the one and two component urethane adhesives and the solvent based vinylidene chloride copolymer adhesives known in the art. It is also well known that there are certain difficulties attendant with the use of such solvent based systems. For example, at least a major portion of the solvent must be removed from the adhesive after application to form a functional adhesive layer, which in turn necessitates additional equipment to ensure that the solvent does not enter the environment or affect persons applying the adhesive. Furthermore, although it is economically desirable to recover the solvent, even the best solvent recovery equipment operates with some loss of solvent.

Water based adhesives (or surfactant-stabilized dispersions of the adhesive in water) are more desirable since the removal of water from the applied adhesive does not encounter the difficulties associated with the known solvent based systems. Nor is it economically necessary to recover the water. Water based adhesives, however, do not generally provide sufficient adhesion of hydrophobic films such as polyolefin films, and especially carboxylated polyolefin films such as Surlyn ® film, either to other hydrophobic films or to non-hydrophobic films such as polyester films, cellulose films, or nylon films. When water based adhesives are used to laminate films, they must be formulated with minimum amounts of free surfactant to approach the adhesive properties of the slvent based systems. However, it has been generally found that as the free surfactant concentration of the water based adhesives is decreased, the stability also decreases. Decreased stability is a problem in commercial operation since the adhesives must be applied at high shear rates to maximize production. Such high shear rates are known in the art to destabilize water based adhesives.

Vinylidene chloride copolymers have been used to formulate water based adhesives for laminating various substrates to hydrophobic films. In general these adhesives are utilized to take advantage of the barrier properties, i.e., low moisture vapor and oxygen transmission properties, provided by the vinylidene chloride portion of the copolymer. Therefore, vinylidene chloride copolymers having a high (i.e. up to 95 percent by weight) vinylidene chloride content have been generally used in such water based adhesives. For example, a series of patents to Dodwell and others disclose vinylidene chloride copolymers having at least 60 mole percent vinylidene chloride, and preferably at least about 80 perent by weight vinylidene chloride, as useful for adhering a hydrophilic silver halide emulsion to a hydrophobic polyester film. (See U.S. Pat. Nos. 4,287,298; 4,244,988; and 4,233,074). These patents suggest that an adhesion promoter be utilized to assist in binding the vinylidene chloride adhesive to the hydrophobic polyester film. Therefore, the high amount of vinylidene chloride taught by Dodwell does not interfere with the adhesive properties of the copolymer. See also U.S. Pat. Nos. 3,988,157 and 4,002,802, to Van Paesschen et al. and Bayless et al., respectively, for other examples of the use of vinylidene chloride copolymers in photographic film.

Some patents disclose that copolymers having a high vinylidene chloride content tend to be crystalline and therefore special techniques are required for their use as adhesives or coatings. For example, in U.S. Pat. No. 3,922,451 to Anschutz et al., the vinylidene chloride copolymer is heated to a temperature of at least 110° C. to adhere the copolymer to the substrate. In U.S. Pat. No. 3,908,070 to Marzolf, the vinylidene chloride copolymer is externally plasticized and applied to films by a coextrusion technique in order to obtain the necessary adhesive characteristics.

Smith et al. in U.S. Pat. No. 3,850,726 teach the use of vinylidene chloride copolymers comprising 70 to 95 percent by weight vinylidene chloride to laminate a polyolefin film to another polyolefin. Again, due to the nature of the vinylidene chloride copolymers disclosed therein, the adhesive must be heat sealed at a temperature of about 270° F. to obtain a substantial adhesive bond between the polyolefin films.

The vinylidene chloride copolymers described in the above references generally include the lower alkyl acrylate ester comonomers, such as methyl, ethyl and butyl acrylate and methacrylate, in combination with relatively high amounts of vinylidene chloride. The lower alkyl acrylates somewhat increase the film-forming capability of the vinylidene chloride copolymer but do not contribute sufficient plasticizing action to yield copolymers flexible enough to be utilized in laminating very flexible films, such as polyolefins, without diminishing the low temperature flexibility of the polyolefin film. More specifically, the combination of high vinylidene chloride content and the lower alkyl acrylate comonomers results in copolymers having a glass transition temperature (Tg) greater than 0° C. (The Tg is the temperature at which a polymer changes from the glassy state to an amorphous state.) Therefore at temperatures of about 0° C. and less, the polyolefin film laminate may become stiff due to the above vinylidene chloride copolymer adhesives.

Vinylidene chloride copolymer compositions containing lower amounts of vinylidene chloride (and a lower crystallinity) are taught by Balloni et al. in U.S. Pat. No. 4,144,363 as useful adhesives for polyolefin films. These compositions are solvent based adhesives and therefore subject to the difficulties in use noted above.

Exceptional difficulties have been encountered in applying adhesives, including vinylidene chloride adhesives, to ionomer films such as Surlyn ® film, a polyethylene film having attached carboxylic acid functionalities which are neutralized with metal ions, particularly zinc and sodium. Ionomer films such as Surlyn ® film are highly desired for use by convertors because of their low cost, high hot tack and impermeability to grease, but even vinylidene chloride copolymers, i.e. copolymers having a high ratio of acrylate to vinylidene chloride monomer, suitable for bonding to both hydrophobic and nonhydrophobic substrates, do not adhere well to ionomer carboxylate-containing copolymers such as Surlyn ® film. Moreover, adhesives containing sufficiently high acrylate to vinylidene chloride ratios are correspondingly deficient in the moisture barrier poperties of the high vinylidene chloride-containing adhesives. The metal ions on the surface of the ionomer films prevent wetting by the polyvinylidene chloride adhesive and therefore impair adhesion thereto. Improved adhesion of polyvinylidene copolmers to films of ionomer carboxylate-containing copolymers having attached metal ions requires a method of altering the adverse effect upon adhesion of the metal ions contained on the surface of the ionomer films.

Therefore, it is the primary object of this invention to provide a film-forming water based adhesive composition suitable for laminating ionomer hydrophobic films containing carboxylate components neutralized by metal ions.

It is another object of the invention to provide water based film-forming vinylidene chloride copolymers suitable for use with hydrophobic polyethylene films containing carboxylate components which do not require heating above 250° F. to be useful adhesives.

It is another object of the invention to provide laminated structures including one or more hydrophobic or non-hydrophobic films adhered to an ionomer carboxylate-containing film and having substantial delamination resistance at high humidity conditions.

A further object of the invention is to provide heat-sealed structures of two or more ionomer carboxylate-containing polyethylene films.

It is another object of the invention to provide a process for adhering ionomer carboxylate-containing polyethylene films to hydrophobic films with an aqueous vinylidene chloride copolymer adhesive.

Other objects, advantages and features of this invention will become apparent to those skilled in the art from the following description.

SUMMARY OF THE INVENTION

Briefly, this invention provides a film-forming adhesive composition useful in laminating substrates containing at least one ionomer carboxylate-containing hydrophobic film, said adhesive composition comprising a dispersion of a vinylidene chloride copolymer in water, the vinylidene chloride copolymer comprising on a comonomer weight basis:
 (a) from about 45 to about 90 percent vinylidene chloride,
 (b) from about 5 to about 25 percent of a polar comonomer having one or more polar groups selected from the group consisting of all hydroxyl-containing components, and
 (c) from about 0 to about 30 percent of a plasticizing monomer for vinylidene chloride in combination with:
 (d) a cross-linking agent for hydroxyl groups. Preferably the cross-linking agent for hydroxyl groups is chosen from the group consisting of dialdehydes having between two and ten carbon atoms, boric acid, water-soluble metal salts of boric acid, and compounds containing methylol groups, such as urea formaldehyde resins and phenol-formaldehyde resins, or mixtures thereof.

Such adhesive compositions are useful for laminating hydrophobic films to non-hydrophobic films or to other hydrophobic films or substrates so as to provide laminated structures having good oxygen and moisture vapor barrier properties. Such hydrophobic films may include polyolefin films such as polyethylene, polypropylene, and ionomer carboxylate-containing polyethylene films, especially Surlyn ® film. Less hydrophobic films (which are characterized as non-hydrophobic films for the purpose of this invention) such as nylon, cellulose and polyester films may also be laminated or may be laminated to Surlyn ® the above adhesive compositions. Such laminated structures containing Surlyn ® film provide high resistance to grease transmission and high hot tack characteristics and may be used in packaging food products, apparel, medicines, oils, lotions and the like.

DETAILED DESCRIPTION OF THE INVENTION

The present invention is directed to compositions especially useful as adhesives, containing aqueous dispersions of a film-forming vinylidene chloride copolymer, wherein the copolymer is the reaction product of vinylidene chloride, a hydroxyl-containing polar comonomer, and, optionally, a plasticizing comonomer and a copolymerizable sulfonic acid or salt, in combination with a cross-linking agent for hydroxyl groups dissolved in the aqueous solution of said copolymer.

Dispersions of such polymers are useful as laminating adhesives, particularly with respect to bonding together hydrophobic film layers, and, in one embodiment, the invention is directed to laminated structures containing at least one substrate layer of an ionomer polyethylene carboxylate-containing film secured with the adhesive composition of the invention.

The vinylidene chloride comonomer imparts film forming properties to the above copolymer and in view of the chemical nature of vinylidene chloride provides a barrier for oxygen and moisture vapor. As noted above, vinylidene chloride tends to form crystalline polymers which do not adhere well to substrates such as hydrophobic films, unless heated to a high temperature, e.g., at least about 150° C. This temperature is not economically reached by means of the film coating techniques and equipment in present day commercial use and in any event would destroy or distort many of the hydrophobic films described herein. Usually, therefore, either a plasticizing comonomer for vinylidene chloride or an external plasticizer is incorporated into the vinylidene chloride copolymers useful in the adhesive compositions of the invention. The crystalline nature of vinylidene chloride can be modified by copolymerizing therewith one or more alkyl esters of acrylic acid or methacrylic acid wherein the alkyl group of said ester comprises from one to ten carbon atoms. The acrylic acid and methacrylic acid esters are plasticizing comonomers for vinylidene chloride and may be designated as internal plasticizers. External plasticizers for vinylidene chloride, known in the art, are not copolymerized with the vinylidene chloride monomer. External plasticizers are relatively low molecular weight compounds which are soluble in the vinylidene chloride homopolymer or copolymer and impart soft properties to the polymer. The plasticizing comonomers increase the film forming tendencies of vinylidene chloride copolymers and, may, in addition, increase the adhesion of the copolymers to hydrophobic surfaces. In particular, the above esters of acrylic acid or methacrylic acid provide adequate film forming properties at a temperature suitable for use by convertors using the techniques and equipment available in commerical practice.

For best results, the ester is selected from the group consisting of acrylic acid esters rather than methacrylic acid esters, since acrylic acid esters tend to soften the copolymer more efficiently on an equal weight basis. More preferably, the ester is selected from the group consisting of methyl acrylate, n-butyl acrylate, n-hexyl acrylate, and 2-ethyl hexyl acrylate, which provide the best balance of adhesive properties to the vinylidene chloride copolymer without a significant loss of oxygen and moisture vapor barrier properties.

The polar comonomer, through the included hydroxyl group, imparts increased adhesiveness to the vinylidene copolymer adhesive composition and provides a site, i.e. the hydroxyl group, for reaction with the cross-linking agent. Preferably the polar comonomer is selected from the group isting of all components having one or more hydroxyl groups. More preferably, the polar comonomer is selected from the group consisting of 2-hydroxyethylacrylate, 2-hydroxypropylacrylate, 2-hydroxyethylmethacrylate and 2-hydroxypropylmethacrylate. Most preferably, the polar comonomer is 2-hydroxyethylacrylate.

To provide the desired balance of adhesive and barrier properties, the vinylidene chloride copolymer comprises from about 45 to about 90 percent, by weight, vinylidene chloride and from about 5 to about 25 percent, by weight, of the polar comonomer. At more than 90 percent by weight of vinylidene chloride, the copolymers are too crystalline and thus do not provide adequate film forming and adhesive properties at the temperatures in use in commercial operations. At levels of less than about 45 percent, by copolymer weight of vinylidene chloride, the barrier properties are insufficient to provide laminated structures having good barrier properties, even with the above hydrophobic films. Therefore compositions having about 70 to 82 percent by copolymer weight of vinylidene chloride are most preferred as combining good barrier properties with good film-forming and adhesive properties.

Preferably, the vinylidene chloride copolymer of the present invention will comprise from about 5 to about 25 percent, by weight, of the polar comonomer. More preferably, the polar comonomer is from about 7 to about 12 percent by weight of the copolymer. The most preferred concentration of polar comonomer is about 10 percent by weight of the copolymer, at which concentration, the compositions of this invention provide the most effective bonding of the copolymer adhesive to ionomer carboxylate-containing films. A lower level of polar comonomer does not provide sufficient chemical interaction with the cross-linking agent to reduce the adverse effect upon adhesion of the metal ions on the surface of ionomer films. A higher level of polar comonomer will increase the viscosity of the dispersion of the vinylidene chloride copolymer of this invention to an unacceptably high level. When 2-hydroxyethylacrylate or 2-hydroxypropylacrylate is utilized, up to 25 percent by weight may be included in vinylidene chloride copolymers and a dispersion having a vicosity suitable for application by the techniques and equipment commercially used in the coating of films is obtained. For example, at 25° C., a composition comprising 45 percent by copolymer weight cf a vinylidene chloride copolymer and about 10 percent 2-hydroxyethylacrylate and the balance a plasticizing comonomer typically has a viscosity less than 200 cps.

Although the polar comonomer will also contribute to the flexibility of the copolymer, the copolymer optionally contains sufficient amounts of a suitable plasticizing agent to further increase flexibility at low temperatures. For example, an internal plasticizing agent such as the plasticizing comonomer 2-ethylhexyl acrylate may be included in said copolymer at a level of as low as 10 percent by weight to yield suitable flexible copolymers. If n-butyl acrylate is utilized as the plasticizing comonomer, then higher proportions, e.g. about 25 percent or greater, by weight, may be necessary to provide copolymers having sufficient flexibility to provide laminated structures that are flexible at low temperatures. In copolymers utilizing high percentages of vinylidene chloride comonomer, for example about 90 percent of vinylidene chloride, external plasticizing agents are preferred to enhance film forming.

As discussed above, vinylidene chloride copolymer adhesives of the prior art generally contain a relatively high proportion of vinylidene chloride and a correspondingly lower proportion of the lower alkyl acrylates such as methylacrylate to emphasize the chemical properties of the vinylidene chloride. These materials are substantially less flexible than polyolefin films at low temperatures but are utilized for the water resistant properties of the vinylidene chloride comonomer. However, to obtain good adhesion with high vinylidene chloride copolymers, substantial heating is required. For example, heating to temperatures of about 260° F. and greater, i.e., from about 270° F. to 300° F., is common. In comparison, the instant copolymers in combination with the cross-linking agent are useful as laminating adhesives, i.e., at the much lower temperatures in the range of from about 130° F. to about 250° F.

Thus, in the preferred embodiment of the invention, the proportion and identity of the above comonomers are selected to provide flexible copolymers suitable for laminating flexible films such as polyolefins to provide flexible laminated structures while providing sufficient vinylidene chloride to obtain the desired oxygen and moisture vapor transmission properties. The copolymer will have a sufficiently reduced crystallinity to ensure low temperature flexibility of laminates containing the instant vinylidene chloride copolymer adhesives.

In addition to comonomers (a), (b) and (c), the vinylidene chloride copolymers of the invention optionally will include a copolymerizable sulfonic acid or salt. The sulfonic acid or salt is usually selected from the group consisting of sulfonic acids and their salts having the formulae: $R-Z-Q-SO_3^-M^+$ and $R-SO_3^-M^+$ wherein R is selected from the group consisting of vinyl and alpha substituted vinyl; Z represents a difunctional linking group which will activate the double bond in the vinyl group (e.g. a carboxylic group, a carboxy amido group, etc.); $-Q-$ is a divalent hydrocarbon having its valence bonds on different carbon atoms; and $M^+$ represents a cation selected from the group consisting of hydrogen, ammonium, and alkali metal cations. Exemplary of such materials are sodium vinylsulfonate, sodium 2-sulfoethyl methacrylate, 2-acrylamido-2-methylpropane sulfonic acid, and sodium 2-hydroxy-3-sulfopropyl methacrylate.

The copolymerizable sulfonic acid or salt thereof stabilizes the dispersion of the vinylidene chloride copolymer adhesive. Thus, by incorporating from about 0.2 to about 1.5 parts of said copolymerizable sulfonic acid or salt per hundred parts of said vinylidene chloride, plasticizing comonomer and polar comonomer, the amount of free surfactant necessary to provide a stable adhesive dispersion may be reduced to less than about 1 percent, by weight, dispersion, e.g., less than 0.5 percent, by weight, dispersion.

The above stabilizing monomers function as a surfactant (as well as an adhesive aid) but are not considered 'free' surfactants because they are copolymerized with the above comonomers (a), (b) and (c). Thus such stabilizing monomers are not free to migrate and interfere with the adhesive properties of the vinylidene chloride copolymer. It is generally desirable to utilize as little free surfactant as possible to enable better adhesion to hydrophobic surfaces such as polyethylene, polypropylene, etc.

The preferred stabilizing monomer is selected from the group consisting of the alkali metal salts of 2-sulfoethylmethacrylate and vinyl sulfonate. While vinylsulfonate and its salts are useful as a copolymerizable sulfonic acid or salt, it has been found that vinyl sulfonate when made by the commercial process generally contains an excess of sodium ion which may interfere with the adhesive bond strength of the vinylidene chloride copolymer. Therefore, the most preferred stabilizing comonomer is selected from the group consisting of the alkali metal salts of 2-sulfoethylmethacrylate, e.g. sodium 2-sulfoethylmethacrylate.

The composition of this invention comprises a film-forming aqueous dispersion of the above-described vinylidene chloride copolymers in combination with a cross-linking agent for hydroxyl groups dissolved in the continuous aqueous phase of said copolymer. The cross-linking agent includes compounds having at least two groups capable of reacting with the hydroxyl group of the polar comonomer on each molecule of cross-linking agent. Usually the composition contains from about 0.01 to about 3 equivalents per equivalent of hydroxyl group contained in said polar comonomer of said cross-linking agent selected from the group consisting of dialdehydes containing from two to ten carbon atoms, boric acid, water-soluble metal salts of boric acid and compounds containing methylol groups, such as urea formaldehyde resins, phenol formaldehyde resins, or mixtures thereof, and preferably selected from the group consisting of dialdehydes containing from two to ten carbon atoms, boric acid, water-soluble metal salts of boric acid, and particularly sodium tetra borate. More preferably the composition contains from about 0.04 to about 1.2 equivalents per equivalent of hydroxyl group contained in said polar comonomer of said cross-linking agent selected from the group consisting of dialdehydes having two to six carbon atoms, including glyoxal, malonaldehyde, succinaldehyde, glutaraldehyde, and adipaldehyde, boric acid, and water-soluble metal salts of boric acid, or mixtures thereof. Most preferably the composition contains from about 0.07 to about 1.0 equivalents per equivalent of hydroxyl group contained in said polar comonomer of a cross-linking agent for hydroxyl groups chosen from the group consisting of glyoxal and sodium tetra borate, with sodium tetra borate most preferred. The improvement in adhesiveness to polyethylene ionomer carboxylate-containing films resulting from using the copolymer adhesive in combination with the cross-linking agent does not decrease the effectiveness of the film as an oxygen barrier.

When the salts of boric acid are employed as cross-linking agents, compositions containing more than about 2 equivalents per equivalent of hydroxyl group contained in said polar comonomer of water-soluble metal salts of boric acid usually display decreased adhesiveness due to the tendency of the salts to orient themselves at the surface of the film in such a way as to interfere with wettability of the film. Also, the formaldehyde-containing cross-linking agents produce undesirable side effects. Urea formaldehyde and phenol formaldehyde resins are the least-preferred of the cross-linking agents since they are the least effective for increasing adhesiveness to ionomer carboxylate containing films and possess the additional undesirable trait of releasing noxious formaldehyde gas during the cross-linking reaction.

The most suitable composition for preparing laminates of hydrophobic films having an ionomer carboxylate-containing copolymer as at least one of the substrates will preferably be a film-forming vinylidene chloride copolymer including on a comonomer weight basis:

(a) from about 70 to about 82 percent vinylidene chloride (b) from about 6 to about 23 percent of a plasticizing agent for vinylidene chloride chosen from the group consisting of ethylhexylacrylate and methyl, ethyl and butyl acrylates and methacrylates and (c) from about 7 to about 12 percent of a polar comonomer selected from the group consisting of 2-hydroxypropylacrylate, 2-hydroxyethylacrylate, 2-hydroxypropylmethacrylate and 2-hydroxyethylmethacrylate in combination with:

(d) from about 0.7 to about 1.0 equivalents per equivalent of hydroxyl group contained in said polar comonomer of sodium borate dissolved in the continuous aqueous phase of said copolymer.

The film-forming polyvinylidene chloride copolymer dispersions of the instant invention may comprise from about 40 to about 50 percent, by weight, solids. It is generally desirable that as little water as possible be utilized as the continuous or dispersing medium, to promote ease of drying. However, such dispersions tend to increase in viscosity as the solids content increases, and higher viscosities make application of the adhesive to film more difficult. Generally a solids content of about 45 percent, by weight, is suitable to balance ease of drying with lower viscosity.

The film-forming polyvinylidene chloride copolymer dispersions of the instant invention generally will have an average particle size of from about 200 nm to about 450 nm, e g., about 350 nm, and a fairly uniform particle size distribution. A lower average particle size tends to increase the viscosity of the dispersion (on an equal solids basis) while a higher average particle size may lead to poor film formation upon drying.

The film-forming polyvinylidene chloride copolymer dispersions of the invention will generally have a surface tension of less than 60 dynes/cm, and preferably less than 55 dynes/cm. The surface tension values are easily achieved with the low amounts of free surfactant required to stabilize the polyvinylidene copolymer dispersions. Moreover, such surface tension values allow the polyvinylidene chloride copolymer in combination with the cross-linking agent to more easily wet and adhere to hydrophobic polyolefin films such as polypropylene, especially to Surlyn ® film.

The above described aqueous dispersion of the film-forming vinylidene chloride copolymer may be prepared by the emulsion polymerization of vinylidene chloride copolymer with the above acrylate comonomers. For example, vinylidene chloride and the above described comonomers may be emulsified in water and copolymerized in the presence of a redox catalyst system or other polymerization catalyst.

In one polymerization procedure, the comonomers, in amounts suitable for preparing the above vinylidene chloride copolymer, are emulsified in an aqueous solution comprising a small amount of one or more nonionic surfactants and one or more anionic wetting agents. To this emulsion a portion of the oxidant used in the redox catalyst system is added and the resulting solution buffered by addition of a suitable buffering agent. The emulsion is then metered to a polymerization reactor and therein combined (at a temperature effective to polymerize said comonomers) with an aqueous solution comprising the reductant of said redox catalyst system and additional nonionic surfactant and/or anionic wetting agent. Additional oxidant may also be metered to said polymerization reactor to ensure complete polymerization of the comonomers. Preferably the nonionic surfactant is selected from the group consisting of the ethylene and propylene oxide adducts of an alkylphenol. The alkylphenol adducts may be represented by compounds having the general formula:

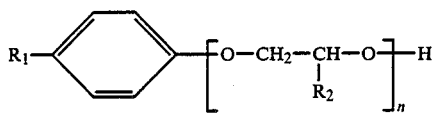

wherein $R_1$ is selected from the group consisting of $C_6$ to $C_{12}$ alkyl radicals, preferabl $C_8$ to $C_{10}$ alkyl radicals, e.g., octyl and nonyl; $R_2$ is selected from the group consisting of hydrogen and methyl radicals, preferably hydrogen radicals; and n ranges from about 10 to about 40, preferably from about 20 to about 30, e.g., about 30.

Preferably the anionic wetting agent is selected from the group consisting of alkali metal and ammonium salts of organic sulfonates and phosphates. For example, the alkali metal or ammonium salts of alkyl aryl sulfonates such as sodium dodecyl benzenesulfonate, sodium diamyl naphthalene sulfonate, etc.; the alkali metal or ammonium salts of alkyl sulfates such as sodium laurylsulfate, sodium myristyl sulfate, etc.; the alkali metal or ammonium salts of an alkyl phenoxy (polyethylene oxy) ethyl ester of phosphoric acid, etc. The sodium salt of dicyclohexylsulfosuccinate has been found to be especially suitable for preparing the vinylidene chloride copolymers of the instant invention.

In a most preferred embodiment, a mixture of a nonionic surfactant such as a 30 mole ethylene oxide adduct of nonyl phenol, with the sodium salt of dicyclohexylsulfosuccinate and an ammonium or sodium salt of an alkylphenoxy (polyethylene oxy) ethyl ester of phosphoric acid is used to emulsify the above monomer mixture and stabilize the resulting vinylidene chloride copolymer dispersion.

The total amount of the nonionic surfactant and anionic wetting agent should be less than about 1 percent, more preferably from about 0.05 to about 0.4 percent, by weight of the dispersion. This low amount of free surfactant is suitable to stabilize the vinylidene chloride copolymer dispersion without significantly diminishing its adhesive properties.

The suitable buffering agent is used to prevent pH variations during polymerization which might interfere with the polymerization reaction. For example diammonium phosphate, diammonium citrate, etc. may be used. It has been found that for the purpose of preparing the vinylidene chloride copolymers of the instant invention dibasic ammonium citrate is especially preferred as a buffering agent since its chelating nature helps stabilize the resulting vinylidene chloride copolymer.

As is well known in the art, a redox catalyst system requires an oxidant and a reductant which, upon combination at a temperature suitable for polymerization, react to yield free radicals. Suitable oxidants for preparing the vinylidene chloride copolymers of the invention are the peroxides, hydroperoxides, aliphatic azo compounds and persulfates. For example hydrogen peroxide, benzoyl peroxide, tertiary butyl hydroperoxide, azodisobutyronitrile, and ammonium persulfate are suitable. A mixture of hydrogen peroxide and ammonium persulfate has been found to be especially preferred for preparing the copolymers of the instant invention.

The reductant may be selected from the group consisting of inorganic reductants, such as sulfites, bisulfites, ferrous salts, etc. and organic reductants such as erythorbic acid, ascorbic acid, sulfoxylates, such as zinc or sodium formaldehyde sulfoxalate. Erythorbic acid is an especially preferred reductant for preparing the vinylidene chloride copolymers of the invention.

The polymerization is carried out at a temperature sufficient to decompose the redox catalyst to form free radicals. For example, a polymerization temperature of at least 100° F., more preferrably 120° to 130° F., is preferred.

The polymerization reaction is preferably effected at a polymerization temperature for a time sufficient to copolymerize substantially all of the above monomers. Usually, time periods of about 30 minutes to about 2 hours or more are required.

The polymerization reaction should be carried out in a glass-lined vessel or a high quality stainless steel vessel. Suitable equipment for copolymerizing vinylidene chloride is well known in the art and need not be described further herein.

The aqueous film-forming vinylidene chloride copolymer dispersion of the present invention may be formulated with various additives known in the art to impart special properties to water based adhesives. For example, if desired, film-forming aids such as low molecular weight external plasticizers (both volatile, i.e., "fugitive," and non-volatile) may be added to further improve film forming properties. However, as noted above, the vinylidene copolymer of the instant invention having less than about 90 weight percent vinylidene chloride copolymer has especially good adhesive properties without the addition of external plasticizers.

If desired, antioxidants such as tertiary-butyl hydroxy toluene, 2-hydrobenzophenones, aryl substituted acrylates, substituted benztriazoles, etc., may be formulated with the vinylidene chloride copolymer to further enhance the otherwise good oxidation resistance of the copolymer.

Fillers and other inert materials are sometimes combined with adhesives by the convertor to provide desired properties. Any of the known inert materials such as clays, calcium carbonate, etc. may be combined with the vinylidene chloride adhesive composition without detriment.

The adhesive compositions of this invention are made by thoroughly mixing a cross-linking agent for hydroxyl groups or an aqueous solution of said cross-linking agent, such as 5 percent by weight aqueous solution of the chosen cross-linking agents for hydroxyl groups, into the continuous aqueous phase of the vinylidene chloride copolymer dispersion after the polymerization reaction has been completed.

The adhesive compositions of the invention, containing a vinylidene chloride copolymer in combination with the cross-linking agent for hydroxyl groups may be applied by the various techniques known in the art for the application of adhesives. For example, the copolymer may be applied by kiss-roll techniques, grauvere roll techniques, etc.

In general the above adhesive compositions are useful as laminating adhesives for both hydrophobic and non-hydrophobic substrates, especially films. For the purpose of the instant invention, the term hydrophobic film shall refer to films having a surface tension similar to (or less than) the polyolefins such as polypropylene. (The surface tension of polypropylene is about 29 dynes/cm.)

Typical non-hydrophobic films may include nylon, for example, films prepared from nylon polymers such as nylon-4, nylon-6, nylon-12, and nylon-66. Note that nylon is defined for the purposes of this invention as any long chain synthetic polymer which has recurring amide groups as an integral part of the polymer chain.

Another class of non-hydrophobic films which may be converted into laminated structures by the aqueous adhesives of the instant invention includes polyester films which may be prepared by the polyesterification of a dicarboxylic acid and a dihydric alcohol. For example, the polymerization of ethylene terephthalic acid or dimethyl terephthalate with propylene glycol, diethylene glycol, tetramethylene glycol or cyclohexane 1,4 dimethyl provides polymers useful as polyester films.

The instant film-forming aqueous adhesives in combination with a cross-linking agent for adjacent hydroxyl groups are most useful for laminating either hydrophobic or non-hydrophobic films to an ionomer carboxylate-containing hydrophobic film. Ionomer films are a class of polyolefins having pendant carboxylate groups associated with monovalent or divalent metal cations. In particular, Surlyn ® film is an ionomer polyolefin having about 90 weight percent polyethylene and about 10 weight percent methacrylic acid neutralized by either zinc or sodium ions. Ethylene-carboxylic acid copolymers and the salts thereof, having from about 0.5 to about 10 percent by weight of the carboxylic acid or salt comonomer, are also useful in preparing the laminated constructions of the instant invention.

Particular hydrophobic films which are useful in forming the laminated structures of the instant invention are the polyolefin films. Polyolefins include polyethylene and propylene and various copolymers thereof. For example, polyethylene films may include alcohol groups such as the hydrolyzed copolymers of ethylene and vinyl acetate. In addition, propylene may be copolymerized with ethylene, to provide ethylene-propylene copolymer film. Furthermore, terpolymers of ethylene, propylene and another comonomer such as a conjugated or non-conjugated diene provide useful hydrophobic polyolefin films. Copolymers of ethylene and acrylate esters are also useful as films. For example, ethylene-ethylacrylate copolymers having from about 20 to about 30 weight percent ethylacrylate and copolymers of ethylene and isobutyl acrylate having from about 20 to about 30 weight percent isobutyl acrylate provide films useful in preparing the laminated structure of the instant invention. Also, ethylene may be copolymerized with chlorinated monomers, such as vinyl chloride and vinylidene chloride, to provide ethylene-vinylchloride copolymer films and ethylene-vinylidene chloride copolymer films, respectively. Such films may advantageously contain from about 5 to about 40 percent chlorine.

The polyvinylidene chloride copolymer adhesive of the instant invention may be applied to hydrophobic or non-hydrophobic films at a coating weight of from about 1 to about 3 pounds per ream. One or more of the hydrophobic or non-hydrophobic films may be adhered to an ionomer carboxylate-containing film by forcefully engaging the ionomer carboxylate-containing film with a hydrophobic or non-hydrophobic film coated with the vinylidene chloride copolymer adhesive of the invention under heat and pressure conditions sufficient to cause the ionomer film to adhere to the coated hydrophobic film. Techniques known in the art for other adhesives may be employed, with nip roll being illustrative.

The adhesive of this invention may also be used to produce structures which laminate combinations of any of the above films. Especially useful structures are obtained by combining one or more of any of the above polyolefin films with nylon. For example, polyolefin films have excellent moisture vapor barrier properties but poor oxygen barrier properties. Nylon films on the other hand show good oxygen barrier properties but poor resistance to the passage of moisture vapor. When such nylon and polyolefin are combined by adhesion through the above vinylidene chloride copolymers, a composite structure is obtained which has both good oxygen barrier properties and moisture vapor transmission properties. The vinylidene chloride copolymer in combination with the cross-linking agent for adjacent hydroxyl groups does not detract from the barrier properties of the polyolefin and films described above, and in addition contributes to such barrier properties. This particular structure has been found to be extremely useful in packaging foodstuffs, especially butter, soft cheese, margarine, fresh meat and the like which are sensitive to water vapor and/or oxygen. Furthermore, the structures are useful in packaging beverages, meat products, fruits, vegetables, nuts, drugs or medicines, oils, or lotions and the like, which require protection from odors, moisture vapor, and/or oxygen.

In addition, combining one or more of any of the above polyolefin films with polyethylene carboxylate-containing films, especially Surlyn ® film, provides structures with high grease resistance and excellent moisture barrier properties since Surlyn ® film is well known for its resistance to penetration by grease and polyolefin films are noted for moisture vapor transmission properties. This structure has been found useful in packaging potato chips, cheese, meat products, and the like which require protection against grease transmission.

The invention is further illustrated by the following examples which are illustrative of specific modes of practicing the invention and are not intended as limiting the scope of the appended claims.

EXAMPLE 1

A most preferred polymerization procedure for preparing the vinylidene copolymer dispersion of the instant invention is exemplified by the following:

0.13 parts $H_2O_2$, 0.16 parts of a 30 mole ethylene oxide adduct of nonyl phenol, 0.04 parts of sodium dicyclohexylsulfosuccinate, 0.07 dibasic ammonium citrate, and 0.05 parts ammonium persulfate are dissolved in 21.91 parts by weight water and charged to a glass lined reactor. Two percent, by weight, of a 'pre-emulsion' prepared by emulsifying 8.98 parts 2-ethylhexylacrylate, 4.55 parts of 2-hydroxyethylacrylate and 31.46 parts vinylidene chloride, in a solution comprising 17.3 parts water, 0.06 parts of the above ethylene oxide adduct of nonylphenol, 0.14 parts sodium dicyclohexylsulfosuccinate, 0.10 parts of an alkyl (phenoxy polyethylene oxy) ethyl monoester of phosphoric acid that has been neutralized with ammonium hydroxide to a pH of 6.5 (Gafac RE-960, available from GAF), and 0.45 parts of a 50 percent aqueous solution of 2-sulfoethylmethacrylate that has been neutralized with sodium hydroxide to a pH of 5.0 is also charged to the reactor. The reactor charge is heated to 125° F. while agitating and the remainder of the 'pre-emulsion' and a solution comprising 0.1 parts erythorbic acid in 9.4 parts water along with a solution of 0.12 parts $H_2O_2$ in 3.3 parts water are concurrently added to the reactor over a period of time to copolymerize substantially all of the above monomers. Heating is continued after cessation of the concurrent addition and then the polymerized mixture is allowed to cool to room temperature. The copolymer prepared by this most preferred polymerization procedure is designated as Sample A in the following examples. The composition of this invention is prepared by stirring a 5 percent by weight of aqueous solution of sodium tetra borate into three samples of the continuous aqueous phase of the copolymer until it is dissolved. The amount of sodium tetra borate in the samples identified as A through D varies from zero to 5 percent by weight.

EXAMPLE 2

Dispersions of vinylidene chloride copolymers in water are prepared in accordance with the most preferred polymerization procedure utilizing the oxidant, reductant, surfactant mixture and buffering agent disclosed therein, with the relative proportions of the comonomers being adjusted to provide the copolymers identified as samples E through K in Table I. The copolymers are tested for adhesive characteristics by a test method which comprises coating the dispersions of Table I on an oriented polypropylene film, Mobil 410 B available from Mobil Chemical Company, by using a number 12 wire wound rod and drying the coated films at 120° C. for 30 seconds in an air circulating oven. The dried films are laminated to a second film of Surlyn ® F. 1605 available from DuPont Company (uncoated) using a Sentinel heat sealer at 170° F., 40 p.s.i.g., and a one second dwell time and conditioned, prior to testing, by aging 15 minutes, overnight at ambient conditions, or one week at ambient conditions. The conditioned films are cut into one-inch wide strips and such strips are T-peeled on a portable slip-laminate tensile tester, available from R. J. Harvey Instrument Co. of Hillsdale, N.J. (hereinafter the "Harvey Tensile Tester") at a rate of 12 inches per minute. Where a range of values is given for the adhesion, the reading on the Harvey Tensile Tester is erratic, due to failure of the adhesive by a zippering mechanism. Such 'zippering' indicates a strong adhesive bond has been obtained. The upper value of such range indicates the maximum strength of the adhesive bond obtained.

It will be noted from the results reported in Table I that Samples C and D, each of which contains a copolymer comprising 70 weight percent of vinylidene chloride, 20 weight percent of 2-ethylhexylacrylate, and 10 percent of 2-hydroxyethyl acrylate in combination with 1.0 and 2.5 weight percent of sodium borate, respectively, show the best adhesion, especially after aging overnight at ambient temperature.

It will also be noted that vinylidene chloride copolymers which contain no sodium borate dissolved in the continuous aqueous phase, are not suitable for adhesion to Surlyn ® films, as is evidenced by the results of Samples A, E and J.

TABLE I

| Sample | A | B | C | D | E | F | G | H | I | J | K |
|---|---|---|---|---|---|---|---|---|---|---|---|
| Weight % Comonomer[a] | | | | | | | | | | | |
| Vinylidene Chloride | 70 | 70 | 70 | 70 | 50 | 50 | 50 | 60 | 50 | 82 | 82 |
| 2-Ethylhexylacrylate | 20 | 20 | 20 | 20 | 40 | 40 | 40 | 30 | 40 | — | — |
| Hydroxyethylacrylate | 10 | 10 | 10 | 10 | 10 | 10 | 10 | 10 | 10 | 10 | 10 |
| Methylacrylate | — | — | — | — | — | — | — | — | — | — | 8 |
| Sodium Borate | — | 1 | 2.5 | 5 | — | 5 | 2.5 | 1 | 1 | — | 5 |
| Adhesion/gms/inch Mobil 410B-Surlyn[R] F 1605 | | | | | | | | | | | |
| 15 mins | 0 | 165 | 300 | 380 | 25 | 100–250 | 150–325 | 125–350 | 380 | 0 | 400 |
| Overnight | 0 | 400 | 400 | 400 | 10 | 100–275 | 150–350 | 400 | 400 | 0 | 275 |
| One Week | — | 525 | 450 | 395 | — | 100–295 | 150–375 | — | — | — | 285 |

[a]Each sample includes 1 part sodium 2-sulfoethylmethacrylate (SEM) per 100 parts vinylidene chloride and acrylate monomers other than SEM.

EXAMPLE 3

Sample C is utilized to laminate oriented polypropylene film, available from Mobil, to Surlyn ® film, available from DuPont. The oriented polypropylene film is coated with sample C to a coating weight of 1.8 pounds per ream. The coated polypropylene film film is dried by passing through an oven maintained at a temperature of 283° F. The dried film and the uncoated Surlyn ® film are laminated to each other by passing through a nip roll maintained at a temperature of 170° F. The line speed of the laminated film is about 200 feet per minute. The initial off machine adhesive bond is measured at 300 g/in. using an Instron Tensile Tester with a jaw separation of one inch and a crosshead speed of two inches per minute. It is found that the addition of 1 to 5 percent, by copolymer weight of sodium tetra borate to Sample A improves the wettability of the polyolefin film and enables one to prepare successfully laminated Surlyn ® film constructions directly off the machine. Such constructions, when tested for adhesive bond directly off the machine, cannot be pulled apart without rupture of the film.

While particular embodiments of the invention have been described, it will be understood, of course, that the invention is not limited thereto since many obvious modifications can be made, and it is intended to include within this invention any such modification as will fall within the scope of the appended claims.

Having now described the invention, I claim:

1. A multilayered structure useful as a packaging material comprising a first layer being an ionomer polyethylene carboxylate-containing film secured at a temperature between about 130° and 250° F. to a second layer through a vinylidene chloride copolymer adhesive, said adhesive forming a third layer and comprising:
   (a) from about 45 to about 90 percent vinylidene chloride
   (b) from about 5 to about 25 percent of a polar comonomer having one or more hydroxyl groups
   (c) from about 0 to about 30 percent of a plasticizing comonomer for vinylidene chloride, and
   (d) a cross-linking agent for hydroxyl groups selected from the group consisting of dialdehydes containing between 2 and about 10 carbon atoms, boric acid, and water soluble metal salts of boric acid.

2. The structure of claim 1 wherein said second layer is a polyolefin.

3. The structure of claim 1 wherein said second layer is nylon film.

4. The structure of claim 1 wherein said second layer is a polypropylene film.

5. The structure of claim 1 wherein said second layer is an oriented polypropylene.

6. The structure of claim 1 wherein said second layer is an ionomer polyethylene carboxylate-containing film.

7. The structure of claim 5 having an adhesive peel strength of greater than 275 grams per inch after 15 minutes aging.

8. The structure of claim 5 having an adhesive peel strength of greater than 375 after 16 hours aging.

9. The structure of claim 5 having an adhesive peel strength of greater than 375 after aging one week.

10. The multi-layered structure of claim 1 wherein said crosslinking agent is selected from the group consisting of dialdehydes having between two and ten carbon atoms.

11. The multi-layered structure of claim 1 wherein said crosslinking agent is glyoxal.

12. The multi-layered structure of claim 1 wherein said crosslinking agent is boric acid.

13. The multi-layered structure of claim 1 wherein said crosslinking is sodium tetraborate.

14. The multi-layered structure of claim 10, 11, 12 or 13 comprising from about 0.1 to about 30 percent of a plasticizing comonomer for vinylidene chloride selected from the group consisting of alkylesters of acrylic acid and methacrylic acid wherein the alkyl group comprises from 1 to 10 carbon atoms.

15. The multi-layered structure of claim 14 further comprising from about 0.2 to about 1.5 parts of a copolymerizable sulfonic acid or salt per 100 parts of comonomers (a), (b), and the plasticizing comonomer.

16. The multi-layered structure of claim 15 wherein said copolymerizable sulfonic acid or salt is selected from the group consisting of compounds represented by the general formulae: $R-Z-Q-SO_3^-M^+$ and $R-SO_3^-M^+$ wherein R is selected from the group consisting of vinyl and alpha substituted vinyl, Z is a bifunctional linking group capable of activating the double bond in the vinyl group, Q is a divalent hydrocarbon having its valence bonds on different carbon atoms, and $M^+$ is a cation selected from the group consisting of hydrogen, ammonium, and alkali metal cations.

17. A multi-layered structure useful as a packaging material comprising, a first layer consisting essentially of an ionomer polyethylene carboxylate-containing film secured to a second layer through a vinylidene chloride copolymer adhesive, said adhesive forming a third layer and comprising:
   (a) from about 70 to about 82 percent vinylidene chloride,
   (b) from about 7 to about 12 percent of a polar comonomer having one or more hydroxyl groups, and
   (c) from about 0.07 to about 1.0 equivalents per equivalent of hydroxyl group contained in said polar comonomer of a crosslinking agent for hydroxyl groups selected from the group consisting of dialdehydes containing between 2 and about 10 carbon atoms, boric acid, and water soluble metal salts of boric acid dissolved in the aqeuous dispersion of the vinylidene chloride copolymer.

18. The multi-layered structure of claim 17 wherein said crosslinking agent is selected from the group consisting of dialdehydes having between two and ten carbon atoms.

19. The multi-layered structure of claim 17 wherein said crosslinking agent is glyoxal.

20. The multi-layered structure of claim 17 wherein said crosslinking agent is boric acid.

21. The multi-layered structure of claim 17 wherein said crosslinking agent is sodium tetraborate.

22. The multi-layered structure of claim 17 wherein said polar comonomer is selected from the group consisting of 2-hydroxyethylacrylate and 2-hydroxypropylacrylate.

23. The multi-layered structure of claim 18, 19, 20, or 21 further comprising from about 0.1 to about 30 percent of a plasticizing comonomer for vinylidene chloride selected from the group consisting of alkylesters of acrylic acid and methacrylic acid wherein the alkyl group comprises from 1 to 10 carbon atoms.

24. The multi-layered structure of claim 23 further comprising from about 0.2 to about 1.5 parts of a copolymerizable sulfonic acid or salt per 100 parts of comonomers (a), (b), and the plasticizing comonomer.

25. The multi-layered structure of claim 24 wherein said copolymerizable sulfonic acid or salt is selected from the group consisting of compounds represented by the general formulae: $R-Z-Q-SO_3^-M^+$ and $R-SO_3^-M^+$ wherein R is selected from the group consisting of vinyl and alpha substituted vinyl, Z is a bifunctional linking group capable of activating the double bond in the vinyl group, Q is divalent hydrocarbon having its valence bonds on different carbon atoms, and $M^+$ is a cation selected from the group consisting of hydrogen, ammonium, and alkali metal cations.

26. A multi-layered structure comprising:
   a first layer being an ionomer polyethylene carboxylate-containing film bearing metal cations on the surface thereof,
   a second layer being a film-forming vinylidene chloride copolymer adhesive comprising:
   (a) from about 45 to about 90 percent of vinylidene chloride
   (b) from about 5 to about 25 percent of a polar comonomer having one or more hydroxyl groups
   (c) from about 0 to about 30 percent of a plasticizing comonomer for vinylidene chloride, and
   (d) a cross-linking agent for hydroxyl groups selected from the group consisting of dialdehydes having between 2 and about 10 carbon atoms, boric acid and salts of boric acid and a third layer being a polymer film.

27. The structure of claim 26 wherein said third layer is a polyolefin film.

28. The structure of claim 26 wherein said third layer is nylon film.

29. The structure of claim 26 wherein said third layer is a polypropylene film.

30. The structure of claim 26 wherein said third layer is an oriented polypropylene film.

31. The structure of claim 26 wherein said third layer is an ionomer polyethylene carboxylate-containing film.

32. The structure of claim 26 having an adhesive peel strength of greater than 275 grams per inch after 15 minutes aging.

33. The structure of claim 26 having an adhesive peel strength of greater than 375 grams per inch after 16 hours aging.

34. The structure of claim 26 having an adhesive peel strength of greater than 375 grams per inch after aging one week.

* * * * *